(12) United States Patent
Le Merrer et al.

(10) Patent No.: US 8,799,434 B2
(45) Date of Patent: Aug. 5, 2014

(54) SYSTEM AND METHOD FOR ESTABLISHMENT OF A CLIENT/SERVER TYPE RELATIONSHIP IN A PEER-TO-PEER NETWORK

(75) Inventors: Erwan Le Merrer, Tregastel (FR); Didier Neveux, Cavan (FR); Thierry Houdoin, Pleumeur Bodou (FR)

(73) Assignee: France Telecom, Paris (FR)

( * ) Notice: Subject to any disclaimer, the term of this patent is extended or adjusted under 35 U.S.C. 154(b) by 1392 days.

(21) Appl. No.: 11/795,932

(22) PCT Filed: Jan. 23, 2006

(86) PCT No.: PCT/FR2006/050038
§ 371 (c)(1),
(2), (4) Date: Jul. 23, 2007

(87) PCT Pub. No.: WO2006/077354
PCT Pub. Date: Jul. 27, 2006

(65) Prior Publication Data
US 2008/0140768 A1    Jun. 12, 2008

(30) Foreign Application Priority Data
Jan. 24, 2005  (FR) ..................................... 05 00694

(51) Int. Cl.
*G06F 15/173* (2006.01)
*H04L 29/08* (2006.01)
*G06F 15/16* (2006.01)

(52) U.S. Cl.
CPC ........... *H04L 67/104* (2013.01); *H04L 67/1008* (2013.01); *H04L 67/1029* (2013.01); *H04L 67/1031* (2013.01)
USPC ............................ 709/223; 709/206; 709/217

(58) Field of Classification Search
CPC .............. H04L 67/104; H04L 67/1002; H04L 67/1008; H04L 67/1012; H04L 67/1029; H04L 67/1031; H04L 67/1034; H04L 67/1038; H04L 67/1093
USPC .......................................................... 709/223
See application file for complete search history.

(56) References Cited

U.S. PATENT DOCUMENTS

2002/0141343 A1 * 10/2002 Bays ............................ 370/235
2003/0126245 A1    7/2003 Feltin et al.
(Continued)

FOREIGN PATENT DOCUMENTS

WO    WO 03/024021    3/2003

OTHER PUBLICATIONS

B. Yang et al., "Improving search in peer-to-peer networks", Proceedings of the 22$^{nd}$ International Conference on Distributed Computing Systems, pp. 1-10, Jul. 2, 2002.
B. Yang et al., "Designing a super-peer network", Proceedings 19$^{th}$ International Conference on Data Engineering, pp. 49-60, Mar. 5, 2003.

(Continued)

*Primary Examiner* — Joseph Greene
(74) *Attorney, Agent, or Firm* — Cozen O'Connor

(57) ABSTRACT

A system for establishing a client/server type relationship in a hybrid peer to peer network connects a first peer (20a) to a second peer (20d) implementing a predetermined function (F) in that peer to peer network. To this end, the first peer (20a) has a superpeer (10a) capable of establishing a list (LF) of the active peers (20d, 20e) implementing the function (F) in the service of the peers of the network and of sending that list (LF) to its peer (20a). The first peer (20a) can then establish a client/server type relationship with a second peer (20d) selected in that list (LF).

15 Claims, 3 Drawing Sheets

(56) References Cited

U.S. PATENT DOCUMENTS

| | | | |
|---|---|---|---|
| 2003/0210770 A1* | 11/2003 | Krejcarek | 379/88.17 |
| 2004/0098370 A1* | 5/2004 | Garland et al. | 707/1 |
| 2005/0281205 A1* | 12/2005 | Chandwadkar et al. | 370/249 |
| 2006/0072468 A1* | 4/2006 | Trollope | 370/241.1 |

OTHER PUBLICATIONS

Schaeffer et al., "PerDis: A Scalable Resource Discovery Service for the ISAM Pervasive Environment", Peer-To-Peer Systems, International Workshop on Hot Topics, pp. 80-85, Oct. 8, 2004.

Singh et al., "Peer-to-Peer Internet Telephony using SIP", Department of Computer Science, Columbia University, Oct. 31, 2004.

* cited by examiner

SYSTEM AND METHOD FOR ESTABLISHMENT OF A CLIENT/SERVER TYPE RELATIONSHIP IN A PEER-TO-PEER NETWORK

RELATED APPLICATIONS

This is a U.S. National Stage of International Application No. PCT/FR2006/050038 filed on Jan. 23, 2006.

BACKGROUND OF THE INVENTION

The present invention relates to a method of communicating in a peer to peer network.

In a peer to peer network all stations (called "peers") have equivalent capacities and responsibilities. This concept differs from the traditional client/server architecture in which a few stations serve the others. In particular, each peer must be able to detect the others. Thus all peers can be organized into peer groups, communicate with one another, publish, and find network resources.

The context of the invention is more particularly that of hybrid peer to peer networks.

This type of network defines superpeers that are elected from among the peers and that act as servers for the ordinary peers to which they are connected, for example for indexing resources, initiating searches, and reducing traffic on the network.

For more information on the conventional hybrid peer to peer architecture, the person skilled in the art may consult the document published on the Internet at the address http://www.grouter.net/gnutella/search.htm.

Current peer to peer networks are used mainly for file sharing. This is known in the art. Such networks, although increasingly popular, nevertheless cannot guarantee that a resource (in this instance a file) is permanently available on the network. This is primarily because the topology of a peer to peer network is dynamic, since the network consists of devices connected to according to their needs or capabilities.

A fortiori, the peer to peer networks known at present do not enable a telecommunications operator to offer a function that can be provided by different peers of the network with an availability equivalent to that of a traditional centralized system.

OBJECT AND SUMMARY OF THE INVENTION

The principal object of the invention is to eliminate the above-mentioned drawbacks.

To this end, a first aspect of the present invention provides a first device that can be used in a hybrid peer to peer network as a superpeer for at least one peer, this device comprising:
  means for identifying the active peers of the network implementing a predetermined function;
  means for sending to a peer of the network a request for that peer to implement the function;
  means for establishing a list of active peers implementing the function; and
  means for sending the list to said at least one of the peers.

Thus a superpeer in accordance with the invention forces the peers of the network to implement the function so as to guarantee, statistically speaking, that at least some minimum number of peers of the network are implementing that function at any given time.

On reception of the list of active peers, a peer of the network can contact an active peer shown in that list using a standard client/server type process.

The above mechanism therefore guarantees that at any given time at least one active peer of the network is offering the predetermined function.

In practice, each superpeer directly and regularly interrogates its peers to verify that they are active and implementing the function.

To identify the active peers managed by the other superpeers, each superpeer preferably includes means for interrogating the other superpeers of the network with an increasing depth.

For example, a superpeer can therefore interrogate adjacent superpeers to a depth of three hops and, if it does not obtain from those superpeers the identifier of an active peer offering the predetermined function, effect a further search, for example to a depth of six hops. This makes the distribution of the functions more uniform within the network and limits the response time.

A preferred embodiment of the superpeer device of the invention includes means for obtaining the load of the peers implementing the function and means for putting aforementioned the list into an order that balances the load between these peers.

In practice, each superpeer can obtain the loads of its own peers directly and the loads of other peers by interrogating the superpeers to which each of them is connected.

Thus a maximum load threshold may be defined for each type of function implemented in the network, as a function of the resources of a peer. The superpeer can then distribute the load dynamically between the various peers, giving preference to the peers in the list offering the function that have the lowest load.

Alternatively, the superpeers can establish the list by varying the load statically, i.e. by generating a circular list or a list in random order, knowing that the peers appearing at the top of the list will be solicited first.

A preferred embodiment of the superpeers includes:
  means for sending to at least one of its peers a request for election as a superpeer; and
  means for requesting at least one of its peers to connect to the superpeer elected in this way.

This feature advantageously enables the load to be distributed between the superpeers.

More precisely, if a peer does not succeed in connecting to a superpeer of the network because of that superpeer's load, a superpeer may accept the connection of that peer temporarily, impose the creation of a superpeer, and then impose the connection of that adjacent superpeer to half of the peers to which it is itself connected, for example, thus distributing the traffic load within the peer to peer network.

A second aspect of the invention relates to a second device that can be used as a peer in a hybrid peer to peer network. This device includes:
  means for obtaining a predetermined function on reception of a request; and
  means for implementing the function in the service of the peers of the network.

By offering the predetermined function on demand, this kind of peer thus ensures the continuity of the service in the network.

Thus the predetermined functions may be resident in a peer, deactivated by default, and activated on reception of a request from its superpeer, for example, or from a central server.

In another embodiment, the peers download a function from a peer of the network acting as a software update server or from a peer of the network hosting the function, whether activated or not, or in the process of acquiring the function.

This feature may also be used to update to a new version of the predetermined function. In this embodiment, the superpeers can progressively remove from their list peers on which a function is no longer up to date, which peers, when advised of this, obtain the new version of the function from the update server or from a peer that has already been updated or is in the process of being updated.

Several embodiments may be envisaged:

In a first embodiment, the peers make themselves temporarily unavailable to the other peers for the time needed to download the function.

In a second embodiment, plug-ins are loaded dynamically without it being necessary to interrupt the service provided. In this embodiment, the operating system and the programming language (JAVA, C++, etc.) must allow this.

In a preferred embodiment, peers of the invention include means for notifying a central server of making their function available.

The central server, typically managed by a telecommunication operator, has access to statistics on the average use of the predetermined function at a given time.

That server therefore knows in real time the actual number of instances of each function present on the peer to peer network and can therefore solicit creation or elimination of the function according to the network load, the date, the time, etc.

In another embodiment, peers send to their superpeer a message representing their computation load.

As briefly mentioned above, this message may be acted on by the superpeer to list the superpeers offering the function in an order that distributes the load within the network.

In a preferred embodiment, the peer of the invention is an Internet access home gateway.

These home gateways have the advantage of being permanently connected to the physical network and therefore significantly improve continuity of service, the disconnection of any of these gateways being primarily for maintenance purposes, and therefore being very much less frequent because of their inherent nature.

A third aspect of the invention relates to a system for connecting, in a hybrid peer to peer network, a first peer with a second peer implementing a predetermined function. This system comprises:

at least one peer of the above kind implementing the function;
a second device of the kind referred to briefly above used as a superpeer of the first peer and adapted:
    to obtain a list of the peers of the network implementing the function;
    to send a request to a peer of the network for it to implement the function; and
    to send the list to the first peer.

The first peer is adapted to select the second peer from the peers in the list and to set up a client/server type relationship with that second peer.

Thus the invention establishes a client/server type relationship in a peer to peer network with performance equivalent to that obtained with a conventional client/server type architecture.

A preferred embodiment of the system of the invention further includes a central server adapted to receive notification messages from peers of the network representing the making available of the function by those peers and means for sending to a peer of the network a request for it to implement the function.

As described above, this central server provides static calibration of the number of peers that are to implement the predetermined function.

The invention may be used in particular to deploy telephony functions conforming to the Session Initiation Protocol (SIP) in a peer to peer network, for example to implement a private automatic branch exchange (PABX) distributed across the peer to peer network.

For more information on the Session Initiation Protocol, the person skilled in the art may refer to the document RFC 3261 issued by the IETF (Internet Engineering Task Force).

In particular, the invention implements the SIP registrar function in peers of the hybrid peer to peer network.

In this embodiment of the invention, a superpeer obtains a list of the peers of the network offering the registrar function. It sends a request to a peer of the network requesting it to obtain this function and sends the aforementioned list to one of its peers hosting an SIP client.

The invention can also implement the SIP proxy function in peers of the network, a superpeer then maintaining a list of peers implementing the proxy function and sending to a peer a request to obtain the proxy function as and when required.

In a preferred embodiment, peers and superpeers of the invention are conventional electronic devices (computers, gateways, etc.) executing a method having various steps that are determined by computer program instructions.

Consequently, the invention is also directed to a method of offering services that can be implemented by a peer in a hybrid peer to peer network. That method comprises:

a step of receiving a request to obtain a predetermined function;
a step of obtaining the function; and
a step of implementing the function.

The invention is further directed to a computer program stored on an information medium, the program including instructions for executing the above method of offering services when the program is loaded into and executed by an electronic data processing system.

The invention is further directed to an information medium readable by a device used as a peer in a peer to peer network and including instructions of the above computer program.

Likewise, the invention is further directed to a connection method that can be used by a superpeer in a hybrid peer to peer network. The method comprises:

a step of identifying active peers of the network offering a predetermined function;
a step of sending to a peer of the network a request for it to implement the function;
a step of establishing a list of active peers implementing the function; and
a step of sending the list to at least one of those peers.

The invention is further directed to a computer program stored on an information medium, the program including instructions for executing the above connection method when the program is loaded into and executed by an electronic data processing system.

The invention is further directed to an information medium readable by a device used as a superpeer in a peer to peer network and including instructions of the above computer program.

The above programs may use any programming language and take the form of source code, object code, or an intermediate code between source code and object code, such as a partially compiled form, or any other desirable form.

The information media may be any entities or devices capable of storing the program. For example, they may include storage means, such as a ROM, for example a CD- ROM or a microelectronic circuit ROM, or a magnetic storage medium, for example a diskette (floppy disk) or a hard disc.

Moreover, these information media may consist of a transmissible medium such as an electrical or optical signal, which may be routed via an electrical or optical cable, by radio, or by other means. The program of the invention may in particular be downloaded over an Internet-type network.

Alternatively, the information media may consist of integrated circuits into which the program is incorporated, the circuits being adapted to execute or to be used in the execution of the method in question.

BRIEF DESCRIPTION OF THE DRAWINGS

Other features and advantages of the present invention emerge from the following description with reference to the appended drawings which show a non-limiting embodiment of the present invention. In the drawings.

DETAILED DESCRIPTION OF ONE EMBODIMENT

Figure 1:
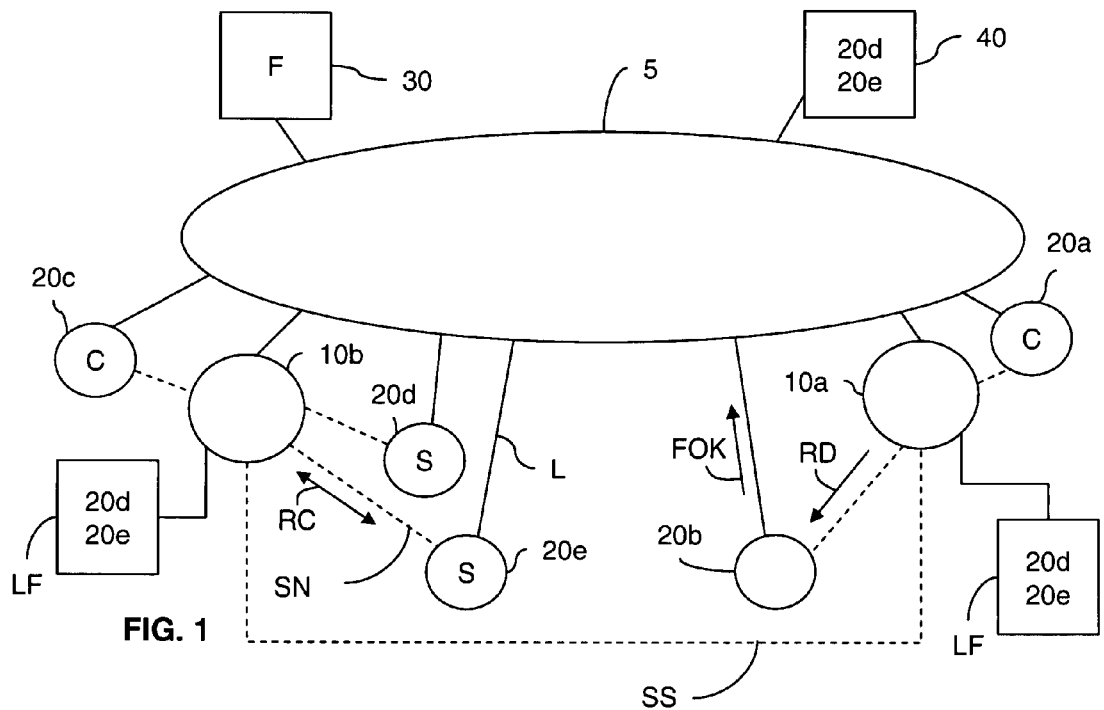
FIG. 1 represents a preferred embodiment of a connection system in accordance with the invention.

FIG. 1 represents an Internet network 5 to which various units are connected by links L indicated diagrammatically by solid lines.

It is assumed that units $10x$, $20x$ of this Internet network 5 have been organized in accordance with a hybrid peer to peer network architecture.

More precisely, it is assumed that devices $10a$ and $10b$ have been elected as superpeers and that:
- the superpeer $10a$ manages the two peers $20a$ and $20b$; and
- the superpeer $10b$ manages the peers $20c$, $20d$, and $20e$.

Links set up within the peer to peer network are represented in dashed line in this figure.

More precisely, the links SN are links between a superpeer and one of its peers and the links SS are links between superpeers.

It is assumed that a first peer $20a$ of the network wishes to access a predetermined function F.

According to the present invention, to make this possible, the superpeer $10a$ of the peer $20a$ maintains an up to date list LF of active peers in the peer to peer network implementing the predetermined function F.

Figure 3:
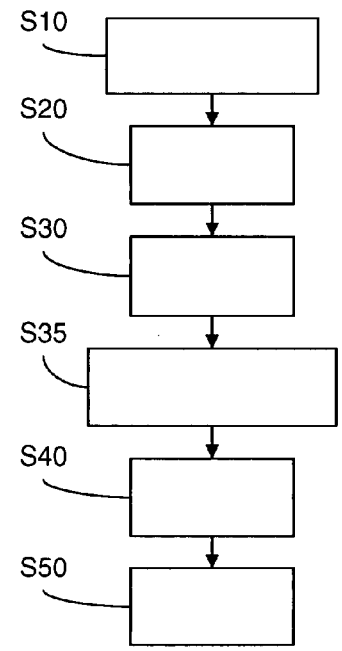
FIG. 3 represents in the form of a flowchart the principal steps of a preferred embodiment of a connection method in accordance with the invention.

The superpeer $10a$ executes a computer program implementing steps S10 to S50 represented in the FIG. 3 flowchart.

This computer program begins with two steps S10 and S20 enabling the superpeer $10a$ to identify the active peers implementing the function F.

More precisely, in a first step S10, the superpeer $10a$ interrogates the other superpeers $10b$ of the peer to peer network to obtain a list of active peers offering the function F known to the other superpeers $10b$.

This interrogation step is preferably effected by interrogating the other superpeers with an increasing depth.

In a peer to peer network, the depth between two peers $10a$, $10b$ is the number of hops that must be effected to reach the peer $10b$ starting from the peer $10a$. In this instance, in FIG. 1, the superpeer $10b$ is one hop away from the superpeer $10a$ (depth 1).

Accordingly, if in the step S10 effected a first time with three hops, for example, the superpeer $10a$ considers that it has not identified sufficient active peers implementing the function F, it may interrogate the superpeers again to a great depth, for example six hops.

In the FIG. 1 example, the superpeer $10a$ receives from the superpeer $10b$ a list LF containing the identifiers of the peers $20d$ and $20e$.

The step S10 of interrogating the superpeers is followed by a step S20 in which the superpeer $10a$ identifies those of its peers $20a$, $20b$ that are active peers implementing the function F.

In this example, neither of the peers $20a$, $20b$ connected to the superpeer $10a$ implements the function F.

If, following these identification steps S10, S20, the superpeer $10a$ considers that the number of active peers implementing the function F is insufficient, then in a step S30 it sends a request RD to a peer of the network to force it to implement that function.

Limiting the search depth ensures a uniform distribution of functions in the peer to peer network.

In the example described here, it is assumed that this request RD is sent to the peer $20b$ of the superpeer $10a$.

Figure 2:
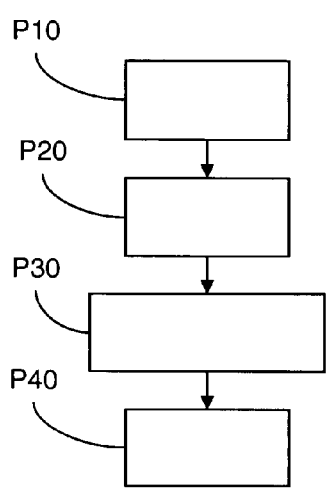
FIG. 2 represents in the form of a flowchart the principal steps of a preferred implementation of a method of offering services in accordance with the invention.

In this preferred embodiment, the peer $20b$ executes a computer program implementing a service offer process having principal steps P10 to P40 that are represented in FIG. 2.

In a first step P10, the peer $20b$ receives the request RD from its superpeer $10a$.

This reception step is followed by a step P20 in which the peer $20b$ obtains the predetermined function F.

In the preferred embodiment described here, this step P20 of obtaining the function F downloads the function F from a peer 30 of the Internet network 5 acting as a software update server or from a peer already hosting the function or in the process of acquiring it.

Following downloading, the peer $20b$ implements the function (step P30) and, in a step P40, notifies a central server 40 of its implementation of the function by sending it a message FOK.

The peer $20b$ may also notify its superpeer $10a$ of its implementation of the function.

In the preferred embodiment described here, this central server 40 is adapted to receive notification messages FOK from the peers of the network and further includes means for sending the request RD that forces a peer of the network to implement the predetermined function F.

This feature ensures static calibration of the number of peers implementing the predetermined function F.

Thus, after the step S30 of the superpeer $10a$ sending the request RD, three peers of the network are active and implement the predetermined function F, namely the peers $20d$, $20e$, and $20b$.

This request sending step S30 is preferably followed by a step S35 in which the superpeer $10a$ obtains the load of these peers.

In practice, this step S35 of obtaining the load is effected by each of the superpeers $10a$, $10b$ sending a request RC to its own peers.

This step S35 of obtaining the load is followed by a step S40 in which the superpeer $10a$ establishes a list of the active peers implementing this function. In the preferred embodiment, this list is in an order that balances the load between the acceptable peers.

Then, in the next step S50, the superpeer 10a sends this list LF to all its peers 20a, 20b.

Accordingly, each peer of the network knows at all times the active peers in the list implementing the function F. According to the invention, this list contains at least a minimum number of active peers because, if the number of active peers falls below a predetermined threshold, the superpeers 10a, 10b of the network or the central server 40 oblige(s) one of the peers to implement the function.

Figure 4:
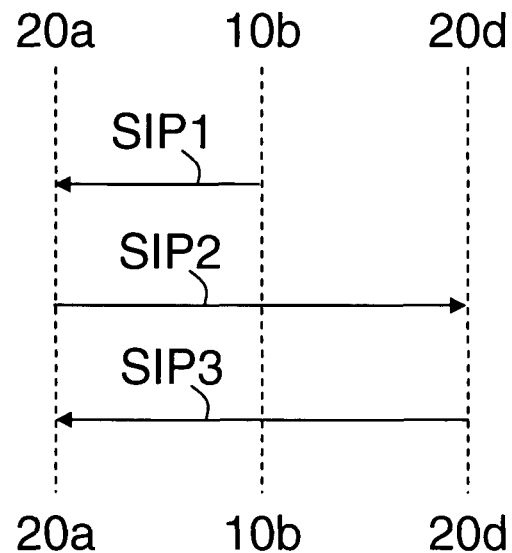
FIG. 4 represents a use of the invention to implement the registrar function of the SIP standard.

This invention may be used in particular in the context of the Session Initiation Protocol (SIP), as described now with reference to FIG. 4.

Accordingly, assuming that the peer 20a is a SIP client and that the predetermined function is the registrar function of that protocol, it is clear that the SIP client always knows the addresses of the registrar servers on the list.

The arrow SIP 1 in FIG. 4 shows the sending of the list LF by the superpeer 10b to the peer 20a.

A known feature of the Session Initiation Protocol is that once this list has been obtained the SIP client 20a can contact the registrar server SIP client 20d at the top of the list to send it a standard registration request SIP2 in a standard peer to peer call.

The registrar server 20d registers the address of the SIP client 20a and acknowledges that registration (arrow SIP3). This is known in the art.

In the SIP universe, the registration (SIP2) and its acknowledgement (SIP3) are renewed periodically at the initiative of the client 20a to maintain its information regarding presence in the network. This is known in the art.

If a transaction fails, several retransmissions are attempted, and, if the failure persists, the registrar server 20d is then considered to be out of service.

A new transaction is then attempted at the next address in the list LF of registrar servers supplied by the superpeer 10b.

That list is preferably cached in each peer 20a.

If all the addresses from the list prove invalid, a new address recovery request is submitted to the superpeer 10a of the client 20a.

The invention can also implement the SIP proxy function.

Figure 5:
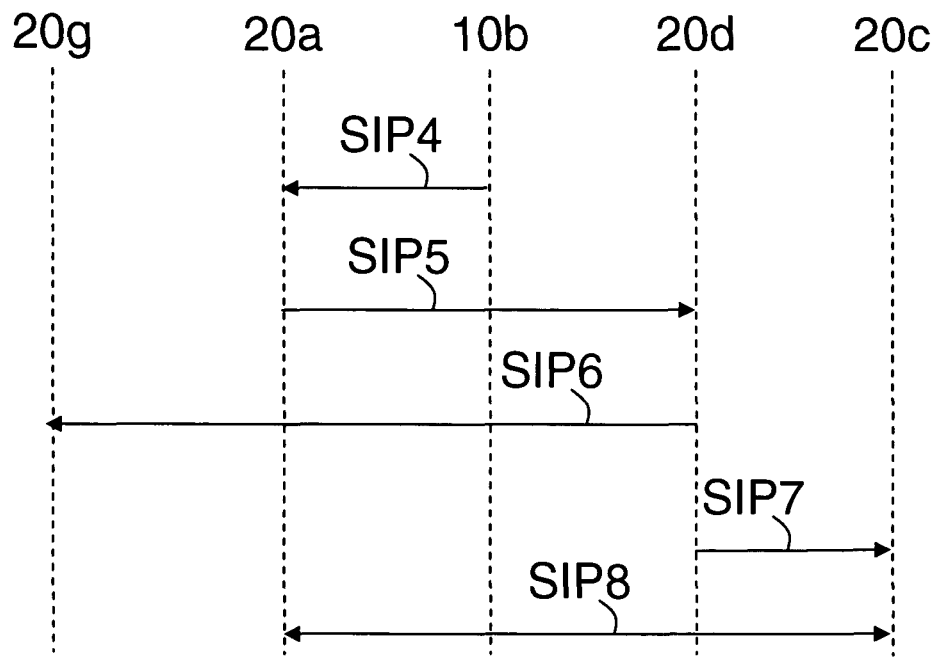
FIG. 5 represents a use of the invention to implement the SIP proxy function.

Referring to FIG. 5, a SIP client 20a is considered to have obtained a list LF of addresses of peers hosting the proxy function by the method described above (arrow SIP4).

Of course, that list is not necessarily obtained synchronously with the generation of a call.

The SIP client 20a seeking to set up a call to another client 20c sends an INVITE request to one of the proxies 20d from the list LF (arrow SIP5).

The proxy 20d then contacts a location server 20g on the network to determine the association between an identifier of the destination SIP client 20c and its physical address in the network (arrow SIP6).

The SIP proxy 20d then enables the call between the SIP clients 20a and 20c.

In a non-limiting example in relay mode, the SIP proxy 20d sends a message to the receiver SIP client 20c to notify it of the attempt to call the SIP client 20a (arrow SIP7).

Then, once the SIP proxy 20d has set up the call, it is no longer involved in the SIP transaction 8 between the SIP clients 20a and 20c.

Alternatively, it may provide a break-in point between the SIP clients 20a and 20c.

The invention may equally be used in the context of the H323 protocol.

An advantageous load distribution feature that can be implemented by the superpeer 10a according to the invention is described next with reference to FIGS. 6A and 6B.

If a peer 20g wishes to be connected to the superpeer 10a, it sends it a connection request. This is known in the art.

Figure 6A:
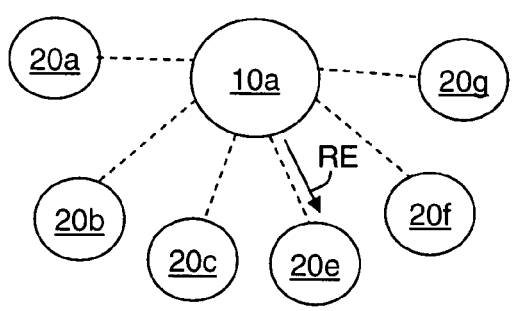
FIGS. 6A and 6B represent an advantageous load distribution feature that may be provided by a superpeer in accordance with the invention.

If the superpeer 10a has resources available, the connection is set up between the superpeer 10a and the peer 20g (FIG. 6A).

If not, the superpeer 10a sends the peer 20g a predefined number of addresses of other superpeers of the network.

If any of those superpeers has resources, a connection can be set up between that superpeer and the peer 20g.

In contrast, if no connection is possible, the superpeer 10a accepts connection of the peer 20g temporarily. It then sends an election request RE to its peers 20a to 20f to determine if they are eligible as superpeers.

If none of these peers 20a to 20f is eligible, it propagates this election request RE to its neighbor superpeers.

In contrast, if any of these peers is eligible, for example the peer 10b, the superpeer 10a sends that peer an instruction to assume the superpeer role.

The peer 10b therefore changes status and retains its connection with its superpeer 10a.

The superpeer 10a then instructs a number of its peers, for example the peers 20f and 20g, to connect to the newly-created superpeer 10b.

Figure 6B:
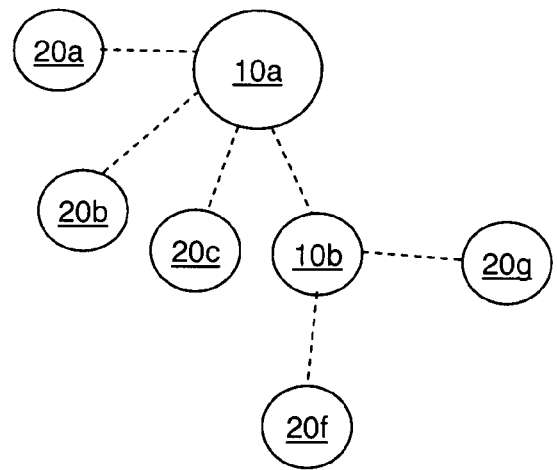

This mechanism has the advantage of distributing the load within the peer to peer network (FIG. 6B).

The invention claimed is:

1. A device for use as a superpeer that manages at least one peer in a hybrid peer-to-peer network that includes at least two active, initially non-implementing peers that do not implement a predetermined function, the device comprising:
    means for receiving a service request for the predetermined function from at least one of the at least two active non-implementing peers;
    means for identifying active implementing peers in the hybrid peer-to-peer network that implement the predetermined function;
    means for determining a number corresponding to how many of said active implementing peers are in the hybrid peer-to-peer network;
    means for sending, to at least one other of the at least two active non-implementing peers, a request for said at least one other of the at least two active non-implementing peers to obtain and implement the predetermined function if said number is less than a predetermined minimum threshold;
    means for establishing a list of said active implementing peers; and
    means for sending said list to said at least one of the at least two active non-implementing peers that sent said service request for the predetermined function.

2. The device according to claim 1, wherein said means for identifying said active implementing peers includes means for interrogating other superpeers in the hybrid peer-to-peer network with an increasing depth.

3. The device according to claim 1, further comprising:
    means for obtaining a load of said active implementing peers; and
    means for putting said list into an order that balances the load among said active implementing peers.

4. The device according to claim 1, further comprising:
    means for sending to said at least one peer managed by the device an election request to determine whether any of said at least one peer is eligible to assume a role of a superpeer;

means for sending, to one of said at least one peer that is determined to be eligible to become a superpeer, an instruction to assume the role of a superpeer; and means for requesting at least one remaining peer of said at least one peer to connect to the elected new superpeer.

5. A device for use as an active, initially non-implementing peer that does not implement a predetermined function in a hybrid peer-to-peer network that includes at least one other active non-implementing peer, the device comprising:

means for receiving, from a superpeer in the hybrid peer-to-peer network, a request to obtain and implement the predetermined function, wherein the request is sent from the superpeer after the superpeer receives a service request for the predetermined function from the at least one other active non-implementing peer and determines that a number of active implementing peers in the hybrid peer-to-peer network that implement the predetermined function is less than a predetermined minimum threshold;

means for obtaining the predetermined function upon receiving the request from the superpeer; and means for implementing the predetermined function.

6. The device according to claim 5, further comprising means for notifying at least one of a central server and a superpeer in the hybrid peer-to-peer network that the predetermined function has been obtained and implemented.

7. The device according to claim 5, further comprising means for sending to a superpeer that manages the device a message including a computation load of the device.

8. The device according to claim 5, wherein the device is an Internet network access home gateway.

9. A connection method for a superpeer in a hybrid peer-to-peer network that includes at least two active, initially non-implementing peers that do not implement a predetermined function, the method comprising:

receiving, at the superpeer, a service request for the predetermined function from at least one of the at least two active non-implementing peers;

identifying, at the superpeer, active implementing peers in the hybrid peer-to-peer network that implement the predetermined function;

determining, at the superpeer, a number corresponding to how many of said active implementing peers are in the hybrid peer-to-peer network;

sending, from the superpeer, to at least one other of the at least two active non-implementing peers, a request for said at least one other of the at least two active non-implementing peers to obtain and implement the predetermined function if said number is less than a predetermined minimum threshold;

establishing, at the superpeer, a list of said active implementing peers; and sending said list to said at least one of the at least two active non-implementing peers that sent said service request for the predetermined function.

10. A non-transitory computer readable medium storing a computer program which when executed by an electronic data processing system performs a connection method according to claim 9.

11. A device used as a superpeer in a peer-to-peer network, the device comprising the non-transitory computer readable medium according to claim 10.

12. The device according to claim 5, wherein the predetermined function is resident in the device and deactivated by default, and said means for obtaining the predetermined function includes means for activating the predetermined function upon receiving the request from the superpeer.

13. The device according to claim 5, wherein said means for obtaining the predetermined function includes means for downloading the predetermined function from an active implementing peer in the hybrid peer-to-peer network that implements the predetermined function.

14. The device according to claim 1, wherein the predetermined function is a registrar function.

15. The device according to claim 1, wherein the predetermined function is a proxy function.

* * * * *